United States Patent [19]

Li

[11] Patent Number: 5,971,061
[45] Date of Patent: Oct. 26, 1999

[54] EDGE-HANGING ORBITAL ROD SUPPORT AND DRIVE FOR VERTICAL TUBE-TYPE HEAT EXCHANGER

[75] Inventor: Yao-Tzu Li, Weston, Mass.

[73] Assignee: Y.T. Li Engineering, Inc., Boxborough, Mass.

[21] Appl. No.: 09/158,439

[22] Filed: Sep. 21, 1998

[51] Int. Cl.⁶ .................................................. F28F 13/02
[52] U.S. Cl. ............. 165/94; 165/109.1; 165/DIG. 320; 62/354; 202/175
[58] Field of Search ................................ 62/354; 165/94, 165/109.1, DIG. 320; 202/175

[56] References Cited

U.S. PATENT DOCUMENTS

| | | | |
|---|---|---|---|
| 3,190,817 | 6/1965 | Neugebauer et al. | 202/236 |
| 3,206,381 | 9/1965 | Neugebauer et al. | 202/185 |
| 3,244,601 | 4/1966 | Diedrich | 202/236 |
| 3,250,687 | 5/1966 | Frank | 159/DIG. 7 |
| 3,265,115 | 8/1966 | Maier . | |
| 3,271,272 | 9/1966 | Watt | 202/236 |
| 3,328,972 | 7/1967 | Svanoe . | |
| 3,498,081 | 3/1970 | Benesh | 62/320 |
| 3,788,954 | 1/1974 | Cantrell . | |
| 4,230,529 | 10/1980 | Li | 202/175 |
| 4,441,963 | 4/1984 | Li | 202/172 |
| 4,468,930 | 9/1984 | Johnson | 62/71 |
| 4,504,361 | 3/1985 | Tkac et al. | 202/236 |
| 4,551,159 | 11/1985 | Goldstein | 62/541 |
| 4,618,399 | 10/1986 | Li | 159/6.2 |
| 4,762,592 | 8/1988 | Li | 202/172 |
| 4,781,245 | 11/1988 | Freychet et al. | 165/94 |
| 4,796,441 | 1/1989 | Goldstein | 62/354 |
| 4,907,415 | 3/1990 | Stewart, Jr. et al. | 62/66 |
| 5,013,368 | 5/1991 | Maroy et al. | 134/22.11 |
| 5,165,469 | 11/1992 | Smith | 62/354 |
| 5,221,439 | 6/1993 | Li et al. | 202/205 |
| 5,363,660 | 11/1994 | Li | 62/71 |
| 5,385,645 | 1/1995 | Li | 202/175 |
| 5,513,698 | 5/1996 | O'Hanlon | 165/94 |
| 5,597,036 | 1/1997 | O'Hanlon | 165/94 |
| 5,768,894 | 6/1998 | Li et al. | 62/71 |

OTHER PUBLICATIONS

Electric Power Research Institute Journal, Cool Storage: Saving Money and Energy, Jul./Aug. 1992, pp. 14–21.
Product Brochure of Calmac Manufacturing Corporation, An Introduction to Off–Peak Air Conditioning OPAC For Commercial Application, pp. 1–8.
Product Brochure of Carrier, "Encapsulated Ice Storage," pp. 1–15.
Holusha, J., New York Times, "Keeping Buildings Cool With Greater Efficiency," Sep. 27, 1992.

*Primary Examiner*—Allen Flanigan
*Attorney, Agent, or Firm*—Peter J. Manus, Esq.

[57] ABSTRACT

A tube-type heat exchanger has a low wear support and drive for a whip rod that orbits over the inner surface of the heat transfer tube to spread a process liquid into a thin falling film. The support and drive includes a conical thrust bearing near the upper end of the rod. An edge of the thrust bearing engages and rolls over a circular rim bearing surface. A stem pin axially aligned with the rod extends upwardly over the rod and through a circular hole in an orbiting drive plate. In one form, the rim bearing surface is formed on the upper edge of the tube, or on the upper edge of a generally cylindrical bearing secured on or over the tube. The thrust bearing is secured between the rod and the stem. A stop disc carried on the stem pin limits the fall of the rod in the tube when the orbiting stops. In another form, the rim surface is formed on a cylindrical collar secured on the upper surface of the drive plate surrounding in the drive hole and the thrust bearing is formed on the lower face of the stop disc fixed on the stem.

16 Claims, 5 Drawing Sheets

EDGE-HANGING ORBITAL ROD SUPPORT AND DRIVE FOR VERTICAL TUBE-TYPE HEAT EXCHANGER

BACKGROUND OF THE INVENTION

This invention relates in general to heat transfer apparatus and processes for evaporating, distilling, freezing, heating or cooling liquids, and more specifically, to an improved, low wear mounting arrangement and drive for a whip rod that orbits within a heat transfer tube.

When processing fluids, it is often required to transfer heat to or from the liquid using a heat exchange surface, typically one formed of sheet metal, and a second process fluid on the opposite side of the sheet metal that is at a different temperature than the liquid being processed. This heat transfer between fluids may serve to warm the process fluid or cool it, as in a glycol chiller commonly used in building air conditioning systems. It may also serve to change the phase of the fluid, as in the production of fresh water by boiling it from sea water, or the production of ice slurries by partially freezing water or a water solution. Ice slurries are useful, among other applications, for cold storage to reduce peak load power demands in building air conditioning systems and to provide refrigeration for food such as milk stored on a dairy farm for transport to a processing plant and fish catches stored on fishing vessels.

The size, and hence the cost, of a heat exchanger depends on the heat transfer coefficient, which reflects resistance to heat flow through a layer of a "hot" fluid, a heat exchanger wall separating the hot and cold fluids, a layer of a "cold" fluid, plus deposits forming on either hot or cold surfaces of the wall. For economic reasons, a substantial temperature gradient is required to drive the heat transfer through these resistances. This high gradient limits the energy efficiency of evaporators or freezers by either limiting the number of stages or imposing a higher lift on a vapor compressor.

U.S. Pat. Nos. 4,230,529 and 4,441,963 to the present applicant disclose an approach to solving these problems using a vertical, thin-walled, open-ended heat transfer tube (or tubes). These early patents teach driving the tube or tubes in an orbital or wobbling motion. This orbital tube motion increases the heat transfer efficiency by swirling a liquid to be evaporated into a generally thin film over the inner surface of the tube. This increases the evaporation surface area and decreases the thermal resistance by decreasing the thickness of the liquid layer. The orbital motion also aids in heat transfer into the tube at its outer surface produced by condensation of a heated vapor stream. The condensation increases the thickness of the liquid layer at the outer surface, and hence its thermal resistance. The orbital motion throws off the droplets, thereby increasing the heat transfer at the outer wall.

U.S. Pat. No. 4,618,399 describes an improved heat exchanger using a whip rod located in the tube which spreads the feed liquid into a highly thin and uniform film to reduce its thermal resistance and to enhance its evaporation. The whip rod also controls the build up of solid residue of evaporation. The rod revolves over the inner surface of the tube in response to an orbiting of the tube and the fluid in the tube. The '399 patent discloses several arrangements for mounting the rod in the tube, yet allowing it to orbit without rotation about its own axis. The include lengths of cables secured to the whip rod at its upper and lower ends, a flexible, but non-rotating anchor connected between a base and the lower end of the rod, and a double universal joint also connected between the lower end of the whip rod and the base. While the whip rod is effective as a film distributor, the mounting arrangements have disadvantages. They increase the overall material, assembly and operating costs. Also, they fail. Material fatigue of flexible cables supporting the whip rods is a particular concern.

U.S. Pat. No. 4,762,592 describes an orbital drive that overcomes the manufacture, assembly, wear and balance problems of the earlier eccentric-crank drives for the tubes and fluids and other structures that move in unison with the tubes. This improved drive uses a rotating counterweight or weights mounted on the evaporator and a spring-loaded strut suspension for the evaporator. The counterweights and the mass of the evaporator revolve around one another as the counterweights rotate. However, it requires the orbital movement of a large mass. This large mass increases the power requirements (particularly on start up), increases the demands on the spring-strut suspension, can lead to an early fatigue failure for the suspension, and generally increases the construction and operation cost of the system.

This approach of orbiting the tubes has been used first for evaporation and distillational and then for freezing. The orbital motion of the entire exchanger, for freezing and boiling applications, suffers from the problems noted above, as well as being difficult to adapt to moving base operation and creating a disquieting psychological impact.

Other problems arise when these orbital heat exchange units are scaled up to more commercially useful sizes and operated under conditions that maximize the heat transfer flux. A straightforward way to scale up at the desired surface-to-volume ratio is to use more tubes.

The masses of the tubes, or the containers, fluid, and tubes, place extreme strains on rotary bearings of eccentrics coupled between a rotary power source and the end application of the force. Large forces quickly produce wear in bearings and at drive surfaces causing play in the drive train and a loss of the desired phase relationships between the movement of groups of tubes.

U.S. Pat. Nos. 5,385,645 and 5,768,894 teach driving the whip rod directly at only one of its ends for any application, boiling or freezing. For example, together they disclose drive plates that (i) suspend a set of rods, (ii) capture the rods in holes in the drive plate to push the rods, while simultaneously using the holes to provide a process fluid inlet to the tube, and (iii) operate a set of cranks that each mount and rotate at least one rod in each tube. A special concern in ice-slurry applications is that at a high cooling rate, ice forming on the heat transfer tube can not only reduce heat transfer efficiency, but it can also grow to fill the tube with ice and eventually freeze the whip rod in the center of the tube. Also, there is typically more ice near the bottom of the tube than the top. It is therefore desirable to reduce the number and size of mechanical obstructions to the exit of the ice slurry from the bottom of the tubes. This suggests a top mounting of the rods for this application.

Figures 1, 2:
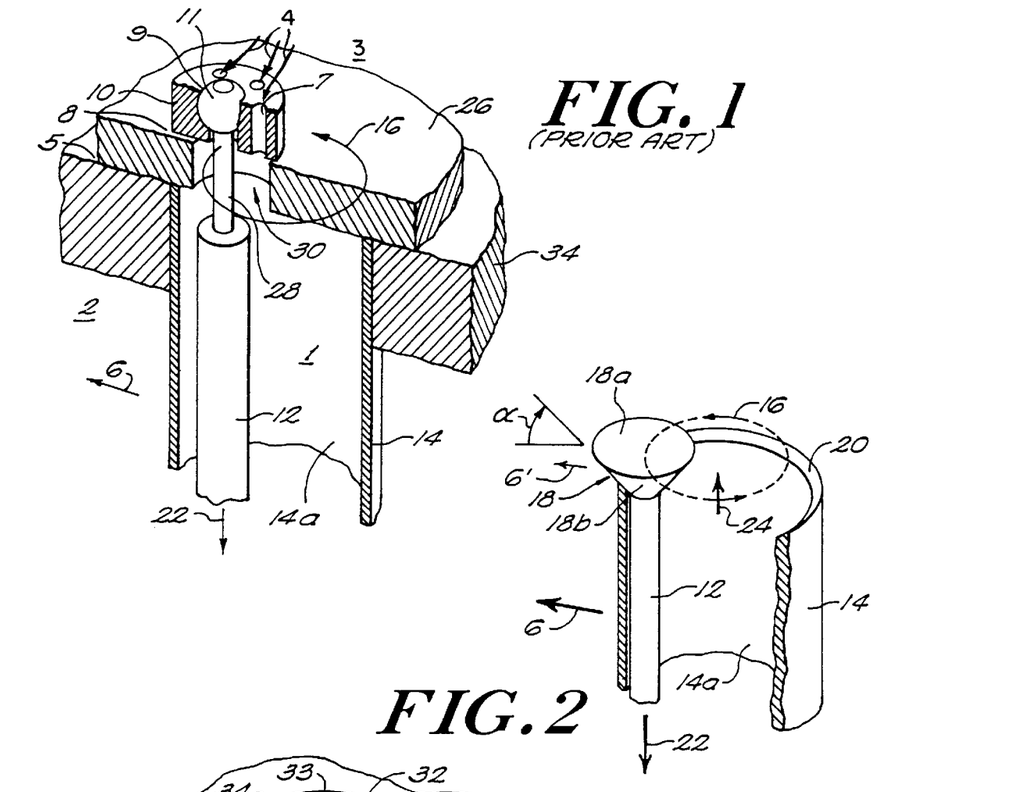
FIG. 1 is a view in perspective, with portions cut away, of a prior art whip rod hung from a ball-and-socket bearing.
FIG. 2 is a view in perspective, with portions cut away, of an "edge-hanging" whip rod support according to the present invention.

While these arrangements offer the various advantages discussed in these patents, it was found that there are persistent and significant wear problems due to friction. These problems appear as uneven wear on the rods as well as wear in bearings and other load bearing surfaces in the drive train. For example, in a present commercial form of the hanging whip rod of this type of heat exchangers, as shown in FIG. 1, the thrust load of the weight of the rods as they orbit is transmitted via ball-and-socket bearings to a drive plate, and then from the drive plate to a tube sheet which mounts the tubes (including three pairs of sliding motion bearing surfaces: rod head-to-bearing, bearing block to an orbiting drive plate, and orbiting drive plate to the fixed tube sheet). Some of the sliding motion may be very fast because the diameter ratio of the tubes and the rod moving in a planetary motion increases friction and wear in all the rod support and drive members. This wear limits the performance and life of the heat exchanger. The high friction also increases the power required to drive the rods.

It is therefore a principal object of this invention to provide support and drive for a hanging whip rod orbiting in a tube-type heat exchanger which significantly decreases friction and wear and correspondingly increases the operational life of the rods and the drive for the rods.

A further object is to provide a hanging whip rod support and drive with the foregoing advantages which reduces the power required to operate the heat exchanger.

Another object is to provide a rod support and drive which also acts a flow rate control mechanism for the fluid infeed to the tubes.

Still another object is to provide a hanging whip rod orbital drive that allows the rod to orbit freely as the orbital radii shrink down to zero, as in the case of a frozen tube.

Another object is to provide a rod support and drive with the foregoing advantages which has a favorable cost of manufacture, both in terms of a low part count and in terms of ease of assembly and ease of disassembly and repair for low cost maintenance.

SUMMARY OF THE INVENTION

A heat exchanger feeds a first process fluid into an upper end of at least one thin-walled, open-ended, generally vertically-oriented transfer tube. An outer housing or shell surrounds the tube or tubes to define a chamber which at least in part causes a second process fluid to come in contact with the outer surface of the tube or tubes. There is a temperature difference between the first and second fluids, one being "hot" and the other being "cold". The inside of the heat exchanger tube is coated with a falling film of the first process liquid.

A direct, positive orbital drive propels the whip rod (or rods) to revolve over the inner surface of the tube (or tubes). The tubes are stationary. The whip rods distribute the liquid over the inner surface. They also control the build up of solid residue that deposits or crystallizes from the process fluid due to the evaporation or freezing. Each whip rod is suspended from its upper end and is mechanically driven by a drive plate mounted over a honeycomb-shaped grill having hexagonal-walled cells matching the spacing of the tubes. The drive plate extends in a plane generally orthogonal to the rod (or rods) and moves the whip rods, or groups of the rods, in unison in an orbital motion within the plane. In one form, the plate is coupled to the rod by capturing an upper stem of each rod in one of the drive holes in the plate.

In the present invention, the upper end of the whip rod is equipped with an enlarged diameter, preferably conical, head whose overhung edge is supported during operation on the upper end of the heat transfer tube, or another member within the heat exchanger, such as the orbiting drive plate. The conical hanging edge of the rod is supported by a circular, preferably beveled rim bearing surface that is generally co-axial with the tube. The edge-hanging thrust bearing engages the circular or "rim" bearing surface during orbiting, which is preferably at a speed sufficient to develop a centrifugal force of at least about 1 g. As the drive accelerates from a standstill to its normal operating speed, the thrust bearing climbs the rim bearing surface as the thrust bearing moves radially outwardly. This cam action continues until the rod is in rolling engagement with the tube wall (which in operation will include a film of the process fluid falling down the tube and/or residue or crystallization deposits formed on the tube wall). Preferably, the rim bearing is formed on or secured over the upper end of the heat transfer tube and the conical outer surface of the thrust bearing has a inclination of about 45° and is formed of hardened steel. The rim bearing surface at the upper edge of the transfer tube is preferably formed of a suitably hard, wear resistant material, such as an engineering plastic, but one that wears more rapidly than the thrust bearing surface.

Also in the preferred form, the rod carries (1) a cylindrical, co-axial stem pin that extends upwardly from the upper face of the conical bearing and (2) a cover disc sliding over the stem and stopped by a collar secured to the upper end of the stem. The stem pin extends through a drive hole in the drive plate when the rod is lowered into the drive hole. Because the disc is larger than the drive hole, it holds the rod within the tube against the force of gravity when there is no orbiting. The disc is stopped by the drive plate resting on the honeycomb grill. The conical bearing dangles below by the length of the stem pin. This allows the upper edge of the conical bearing to remain at a level above the height of the rim bearing, thus making it ready for engagement with the rim bearing once the orbital motion begins. This same disc, together with the drive hole, also act as a flow rate control valve for the process fluid flowing into the tube via the drive plate hole. To provide a uniform wear rate and to avoid sliding frictions which would produce excessive wear, the ratio of the outer diameter of the stem pin to the diameter of the drive plate hole is substantially equal to the ratio of the diameter of the whip rod to the inside outer diameter of the associated heat transfer tube.

In yet another form, a cylindrical collar is secured to the upper surface of the drive plate surrounding the drive plate hole. The upper edge of the collar is beveled and acts as the circular bearing surface. It engages a mating of conical bearing formed as the lower face of the disc. In this form, the conical bearing has a shallower angle of inclination, e.g., 5°.

In either form, the radial thrust produced by the orbiting rod is transmitted directly through the tube to a tube sheet that surrounds and supports the tubes. The drive plate and/or the collar secured on the drive plate push the rod in a direction tangential to the centrifugal force of the orbiting rod during steady state operation. The resistance of the rod rolling inside the tube to spread the process fluid constitutes the primary energy demand to be supplied by the drive plate. The frictional force due to the weight of the rod in orbital motion constitutes the secondary energy demands. The reduction of these secondary energy demands and the elimination of the wearing surfaces associating with the consumption of these secondary energy demand is the primary object of this invention.

Viewed broadly as a process, the present invention includes the steps of suspending a whip rod within a vertical, open-ended heat exchanger tube to permit the rod to fall a predetermined distance when the rod is not orbiting, orbiting the whip rod during operation, and edge-hanging the rod to support its gravitational weight when it is orbiting within the tube. The process includes the step of allowing said orbiting and edge-hanging to occur simultaneously and with a rolling contact. It further includes the step of camming the whip rod—using the centrifugal force on the whip rod developed by said orbiting—from the lowered, non-orbiting position to the raised, edge-hanging position.

These and other features and objects will be more fully understood from the following detailed description that should be read in light of the accompanying drawings.

BRIEF DESCRIPTION OF THE DRAWINGS

FIGS. 6a'–6c' show simplified top plan views corresponding to FIGS. 6a–6b, respectively, of the contact footprints of these alternative bearing contours;

DETAILED DESCRIPTION OF THE PREFERRED EMBODIMENTS

FIG. 1 shows a generalized, known, tube-type heat transfer apparatus where an "outside" chamber 2 contains a second process media which activates the heat transfer process and an "inside" chamber 1 contains a first process media which is being processed. An orbital drive propels a whip rod 12 around the inside surface 14a of a vertically-oriented, open-ended heat transfer tube 14. The tube 14 is thin-walled and made of a material with high heat transfer properties such as copper or steel. The first process media is introduced into the tube where it flows downwardly under the force of gravity while being spread into a thin film by the orbiting whip rod 12.

The second fluid media is circulated over outside of the tube. Depending on the relative temperatures of the fluids forming the first and second media, there is a radial heat transfer through the walls of the tube 14 which either boils the first media inside the tube (e.g., an evaporation) or cools the first media (e.g., a freezing). The use of such tube-type and whip rod heat transfer apparatus for boiling and freezing applications described in detail in U.S. Pat. Nos. 5,385,645; 5,363,660; and 5,768,894, the disclosures of which are incorporated herein by reference.

The orbital motion of the whip rod 12 is illustrated by the path 16 which depicts the circular locus of the center of mass of the whip rod as it orbits over the inside surface 14a of the heat transfer tube 14. This orbital motion generates a centrifugal force 6 that causes the whip rod 12 to bear upon the inside surface of the tube 14. Operating in the falling film mode, this motion of the whip rod spreads the liquid into a thin and uniform liquid film that facilitates its evaporation or freezing as reflected in a comparatively high heat transfer co-efficient. The centrifugal force 6 also aids in maintaining a generally vertical alignment of the whip rod within the tube and it provides a mechanical force used by the whip rod to clear solid residue produced by the evaporation or freezing processes which is otherwise builds on the inside wall 14a where it reduces the heat transfer co-efficient.

The rod 12 must sufficiently stiff that it will form the inlet flow of the process media into the thin film, but it must also be sufficiently flexible to conform to the tube wall when orbited or "whipped". While the preferred materials for the whip rod will vary from application to application depending on factors such as the process media and requisite durability, stainless steel is the material currently preferred for most applications. A typical rod has an outside diameter of ¼ inch and a length of approximately 4 feet.

As discussed in U.S. Pat. No. 5,768,894, for freezing applications, where the heat transfer apparatus is used to form ice slurries or chilled liquids, as well as for evaporation or boiling applications, it has been found to be advantageous (1) to orbit the whip rod directly while holding the heat transfer tube stationary and (2) to support and drive the whip rod from only its upper end. As noted in the Background of the Invention hereinabove, various plate and crank drives are known for orbiting the rods in this manner. Suspending and driving the rod from a single plate which is driven by a motor and eccentrics to execute an orbital motion is known at least from U.S. Pat. Nos. 5,385,645 and 5,768,894. Use of a crank interposed between an orbiting drive plate and the rods is disclosed in U.S. Pat. No. 5,768,894. Each rod, or a upright drive pin, is captured in an oversized hole formed in the drive plate.

FIG. 1 also shows a known construction for hanging a whip rod 12 where the rod weight, shown by a vertical force vector 22, is supported by a ball and socket bearing 11, which in turn transmits that force to a bearing block 10, then to the drive plate 26 and then down to the top surface of a tube sheet 34. In the case of using a crank in each tube, that force will be transmitted to the crank, then to its bearing, and then to the tube sheet.

A number of holes 7 are provided on the bearing block 10 to regulate a flow stream 4 of the first process media (e.g., water and solutes) from a process media infeed box 3 into the tubes 14 and the inside chamber 1. This fluid is distributed by rod 12 upon the inside surface 14a of tube 14. The difference of the temperature of the working medium in the outside chamber 1 with that in the inside chamber 1 will cause the phase change of the fluid inside chamber 1, and thereby to complete the functional operation of the heat exchange process.

For small scale systems, this type of construction satisfies the fundamental requirement of the process operation. The drive plate 26 provides the sliding seal of the tubes to the separate the chamber 1 from the chamber 3. The long term wear requirement for industrial uses have yet to be determined.

But as soon as the heat transfer co-efficient and the scale prevention capabilities of the orbital rod system were established with small scale systems, the demand for increasing the system reliability and decreasing the cost become the determining factors for commercialization.

As shown in FIG. 1, the gravitational force 22 of rod 12 is transmitted via three pairs of sliding mating surfaces at interfaces 5, 8, and 9 in series between the tube sheet, the drive plate, the bearing block, and the rods. For instance at an orbital operating speed of 1000 rpm, the rod may revolve at 5000 rpm. This is quite fast for sliding type of bearings or seals, and highly susceptible to wear.

As shown in FIG. 1, the energy needed to drive the drive plate 26 into the orbital motion 16 is consumed in two parts. The primary part is to move the rod 12 to roll upon the inside tube surface 14a to spread the process fluid and the second part pertains to all of the friction losses at the sliding mating surface interfaces 5, 8, and 9. The elimination of these load-carrying wear surfaces is the objective of this invention.

A key feature of the present invention, as illustrated in FIG. 2, is to support the vertical weight of the rod on a "hanging edge" provided by a conical thrust bearing 18 secured to, or formed integrally with, the upper end of the whip rod 12. The bearing 18 has a large diameter base 18a at its upper surface. It has an outside diameter greater than the outside diameter of the rod 12, which create the hanging edge. This conical surface engages and rolls on a circular, beveled bearing surface 20. As shown in FIG. 2, it is formed on the upper edge or rim of the heat transfer tube 14. Preferably, the angle of inclination a of the bevel and conical surface is the same. The whip rod 12 and bearing 18 rotate about the central longitudinal axis 22 of the whip rod. The rod 12 rolls over the inside surface 14a of the tube 14 as the conical thrust bearing rolls on the rim bearing surface 20. The conical thrust bearing 18 is shown as having an angle of inclination α of about 45°.

When the orbital speed of the whip rod 12 is sufficiently great, centrifugal force 6 drives the whip rod radially outwardly. A major portion of the centrifugal force 6 will be distributed along the entire length of the tube, while a small portion 6' will exert sufficient force to cause the conical thrust bearing 18 to cam over, or climb, the beveled bearing surface 20 until it reaches the normal operating position shown in FIG. 2. This outward and upward movement continues until the whip rod is in a generally continuous rolling engagement with the inside surface 14a. Because the centrifugal force must raise the rod and bearing against the force of gravity, the centrifugal force component 6' required to place the rod and bearing in the operating position is about 1 g for the 45° inclination, as shown in FIG. 2. The rate of rotation of the rod must be such to produce at least this force level. An angle of about 45° is useful in assuring that the thrust bearing will "climb" the rim bearing even as it slowly wears down.

By way of illustration, but not of limitation, for a ¼ inch outside diameter rod, a 1.4 inch inside diameter tube (orbiting radius of 0.575 inch), a centrifugal force 6 of approximately 1 g is generated at 230 rpm. Because only a small portion of the centrifugal force is available at the tip of the rod, a speed above 500 rpm may be necessary to be sure to lift the rod and the thrust bearing (having a 45° inclination) into the position shown in FIG. 2. In this position, the weight of the whip rod and the thrust bearing is supported completely on the tube 14 due to the overhanging engagement of the thrust bearing and the rim bearing surface 20. In this manner, the gravitational force acting on the rod does not contribute to frictional wear of the rod because all of the bearing surfaces involve what is substantially a rolling contact, not a sliding contact.

Figure 3:
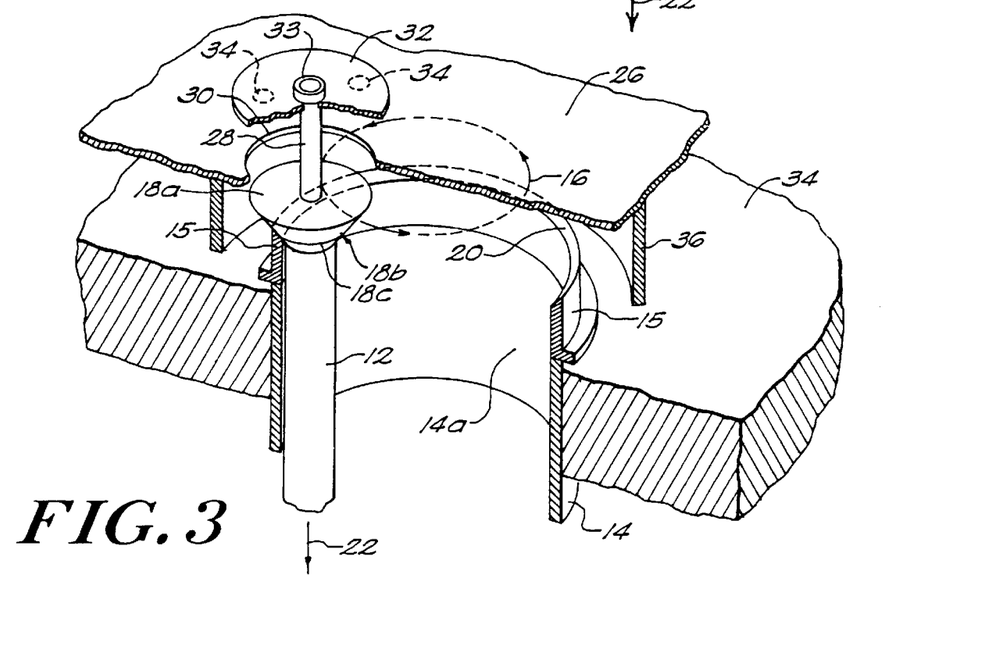
FIG. 3 is a view in perspective corresponding to FIG. 2 of the rod support of FIG. 2 operating with a plate drive and a disc stop, both according to the present invention.

FIG. 3 show an edge-hanging whip rod of FIG. 2 combined with a plate-type orbital drive that includes a drive plate 26 driven by one or more motors and eccentric bearings (not shown) in a well-known manner to execute an orbital motion (as illustrated by the path 16). The path of motion of the center of a drive hole 30 and that of the center of the whip rod is co-axial with the central axis of the tube 14. The motion of the drive plate is mechanically coupled to the whip rod through a short cylindrical rod or stem pin 28 secured to, or formed integrally with, the rod and the conical thrust bearing 18. The stem 28 extends along the center of the rod through the drive hole 30 formed in the drive plate 26. The back edge of the drive hole 30 continuously pushes the stem pin 28 in a direction tangent to the path 16. The stem 28 thus revolves about and rolls in the hole 30 causing the whip rod 12 to revolve about and roll in the tube 14.

A stop member, shown in its preferred form as a circular disc 32, is free to slide axially along over the stem, but is stopped by a collar 33 which is secured at the upper end of the stem, spaced by the length of the stem from the upper surface 18a of the thrust bearing 18. The disc 32 has an outer diameter that is at least slightly larger than that of the drive opening 30. As a result, when the whip rod is not being driven, the rod falls under the influence of gravity downwardly in the direction of the arrow 22 until the disc 32 rests on the drive plate 26. The length of the stem 28 is selected so that when the rod is in this lower, non-orbiting position, the outer most edge of the conical bearing surface 18b remains at a level above the circular rim bearing surface 20 so that engagement between them may resume when the rod is thrown radially outwardly by a centrifugal force. This disc 32 also serves a second function, namely, to maintain a pre-selected, crescent-shaped opening or gap between the outside diameter (OD) of the disc 32 and the inside diameter (ID) of the drive hole 30. This gap (105 in FIG. 10) can regulate the flow rate of the inlet (first) process media into each tube 14.

To minimize the wear, it is desirable to maintain the ratio of the diameter of the outside diameter of the stem pin 28 to the inside diameter of the drive hole 30 the same as the ratio of the outside diameter of the whip rod 12 to the inside diameter of the tube 14.

While there are various types of materials and various shapes of the mating conical edge-hanging bearing surface that would be suitable for many of the various types of fluids to be processed, one aspect of the present invention is the materials and shape of a bearing contact area or "band" 18c (FIG. 3) on the conical thrust bearing surface 18b is substantially "unwearable" throughout the anticipated running period between regular field services. During this same period, the bearing surface 20 of a rim bearing 15 formed on, or secured to or over, the upper end of tube 14, is subjected to a slow wearing down, so that the full length of the rim bearing 15 will last for a predetermined overhaul period. The rim bearing is preferably formed of an engineering plastic such as IGUS T500. This overhaul time, between regular field servicing, may be 3 years, or some other period of time as demanded by the relevant industry served by each application. With this wearing down process as the background, the following four operating conditions should be considered in determining the precise size, shapes, and materials to be used: (a) a new, full-height rim bearing 15 in the stationary condition (not orbiting), (b) a new, full-height rim bearing in the orbital running condition, (c) a fully-worn rim bearing in the stationary condition, and (d) a fully-worn rim bearing in the orbital running condition.

Figure 10:
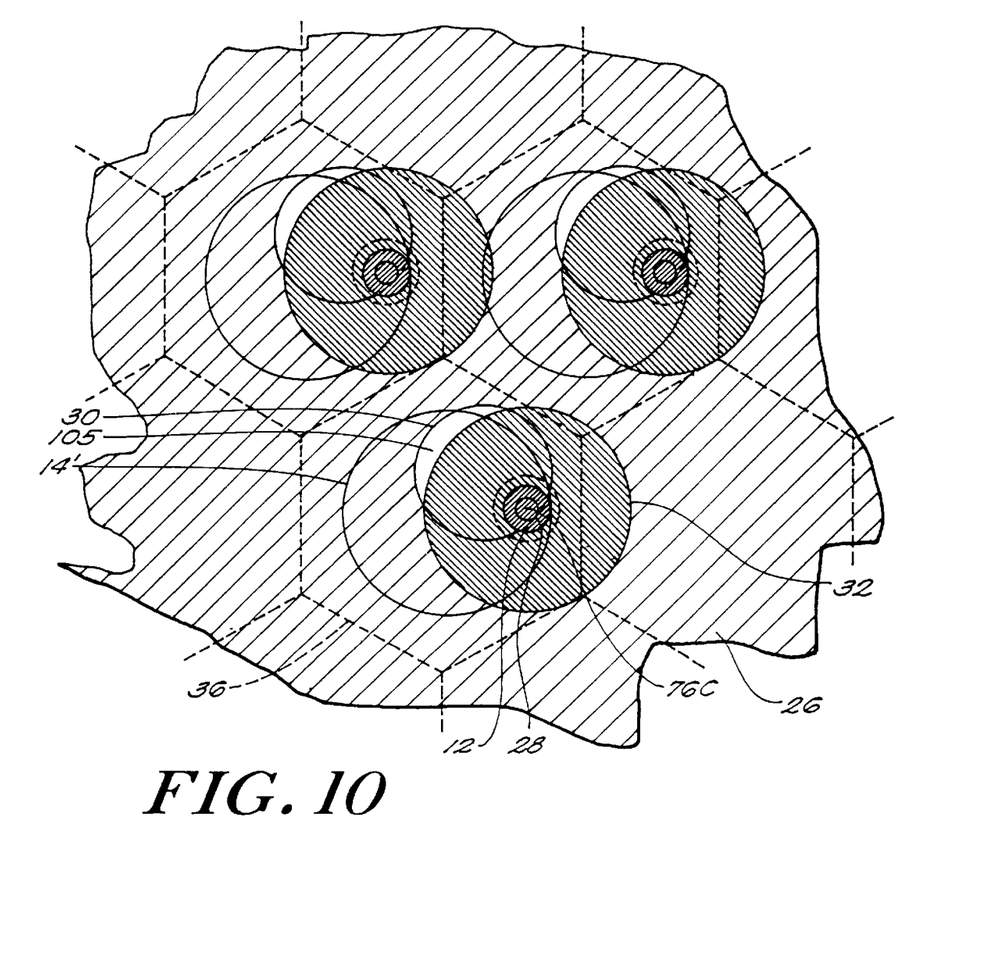
FIG. 10 is a top plan view of a multiple tube and rod heat exchanger of the type shown in FIG. 4 utilizing a honeycomb stand-off structure to support the drive plate and to control fluid feed to the tubes.

With reference to FIGS. 3 and 10, the drive plate 26 is supported by a honeycomb-shaped grill 36 of hexagonal-walled cells. Each cell confines the fluid that enters an associated tube 14 located at the center of that cell. The grill 36 can be made as one single piece of molding, or assembled from strips of sheet material.

To satisfy the four conditions listed above, the height of the grill 36 is slightly higher than the sum of the height of an unworn rim bearing 15 plus the height of the cone bearing 18*b*. The height of the bearing 18, the stem 28, and the unworn rim bearing 15 are typically about the same, and the height of the grill 36 is slightly more than twice any of these values. As a result, during orbiting, the cone bearing 18 can ride on top of the new rim bearing while orbiting with a comfortable clearance under the drive plate 26 supported by the grill 36. As mentioned above, the disc may slide on the stem 28. Thus, the disc 32 in its normal running condition would slide down along the stem 18 to cover the drive hole 30. Openings 34 (shown in phantom) in the disc 32 represent an alternative arrangement for flow control.

On the other hand, in the stationary condition, the weight of the rod pulls the cone-shaped bearing 18 down from the rim bearing of 15 until the collar 33 is stopped by disc 32. At that time the upper surface 18*a* of the cone bearing should remain higher than the bearing surface 20 of the new rim bearing 15 so that when a new operative cycle begins, the centrifugal force will raise the cone bearing into the orbiting condition.

As the rim bearing 15 wears down, the rod will gradually operate at a lower level inside the tube until finally there is very little difference in the rod position in either the stationary condition or in the orbiting condition. At this time, the rim bearing 15 must be replaced. The operating life of this rim bearing is selected to be long enough to satisfy the required industrial standards.

A significant aspect of the rod support and drive shown in FIG. 3 is that the thrust load of the rod 12 is transmitted directly to a tube sheet 34 through rolling contact. This contrasts favorably with present design of hanging whip rod drives where the thrust load of the weight of the rods is transmitted first to a drive plate with a ball-and-socket bearing, and then, via the drive plate, to an upper tube sheet supporting the tubes as shown in FIG. 1. In these known arrangements, at each thrust bearing surface in the drive there is a friction load and wear. The friction not only introduces wear-life problems, but also requires a larger drive motor to overcome the friction. Also, the drive plate 26, and the drive train as a whole, of the present invention can be lighter and of a less complex design than the drive plate used in known support/drive arrangements, because, for example, it does not carry the weight of the rods during operation, and there are reduced power requirements.

Figure 4:
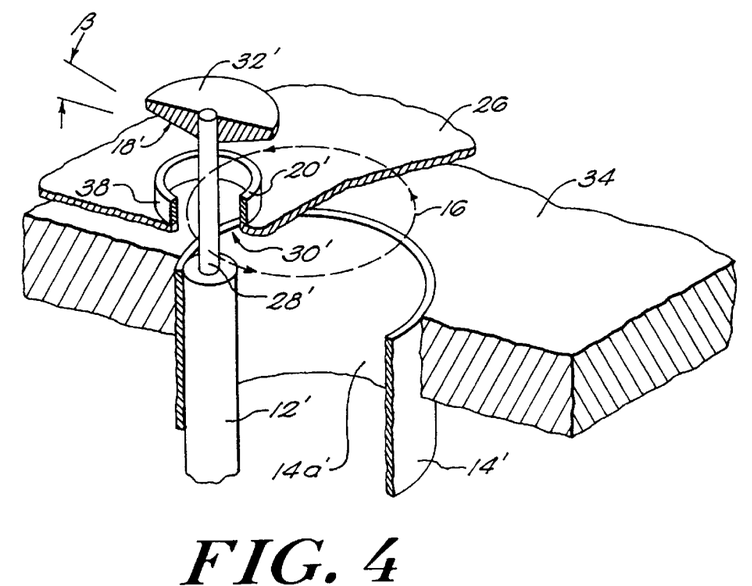
FIG. 4 is a view in perspective of an alternative embodiment of the present invention with a collar support for the rod carried on the drive plate and a mating conical bearing surface formed on the lower face of a disc stop.

FIG. 4 shows another alternative embodiment of the present invention with like parts in the various embodiments having the same reference number as in FIGS. 2 and 3, but distinguished with the prime mark ('). In this embodiment the stop member or disc 32' has the conical thrust bearing 18' formed on its bottom face, and with an angle of inclination β which is significantly shallower, e.g., 5°, than the angle of inclination α in the FIGS. 2 and 3 embodiments, typically about 45°. The disc 32' is fixed on the stem 28'. Further, rather than forming the rim or circular bearing surface 20' on the upper edge of the rim bearing 15, the rim bearing surface 20 is formed on the upper edge of a cylindrical collar 38 that is secured to the upper surface of the drive plate 26 around or within the drive hole 30'. As in the FIG. 3 embodiment, the thrust bearing 18' is preferably formed of hardened steel and the bearing surface 20' is formed of a comparably hard, wear resistant material such as the aforementioned engineering plastic, or a hardened metal. The whip rod 12 is connected to the disc 32' and the thrust bearing 18' by stem pin 28' which is co-axial with the rod 12'.

The drive plate 26 moves in an orbital motion which is again shown by the path 16. As it orbits, the rear, or following, surface of the collar 38 and/or the drive hole 30 contacts the stem pin 28' to push the stem pin and the attached whip rod 12' in a direction tangential to the path 16.

As in the FIG. 3 embodiment, the stop disc 32' has an outer diameter larger that the inner diameter of the underlying collar 38 so that when the rod is not being orbited, the stop plate comes to rest on the bearing surface to hold the whip rod in position within the heat transfer tube. As the collar 38 and drive hole 30' push the stem 28' from a rest position, the conical thrust bearing surface 18' cams the rod upwardly onto the rim bearing surface 20' opposed by the weight of the rod. When the stem is in the normal operation position shown in FIG. 4, with the collar 38 in contact with the stem 28', the orbital motion of the drive plate 26' causes the stem 28' to roll within the collar 38, and the conical bearing surface 18' to roll over the rim bearing 20' in coordination with the rolling of the whip rod 12 over the inside of the tube 14'. There is therefore substantially no sliding friction within the support and drive of the whip rod 12' as it orbits within the tube 14'. Because the rod 12' is supported on the drive plate, not the heat transfer tube, the plate still needs to supply the tangential friction force to orbit the rod even through the wear problem of the ball-and-socket joint shown in FIG. 1 is avoided. As in FIG. 3 embodiment to reduce wear the ratio of the outer diameter of the rod stem 28' to the inner diameter of the collar 38 is substantially equal to the ratio of the outer diameter of the whip rod 12' to the inner diameter of the heat transfer tube 14'.

Figure 5:
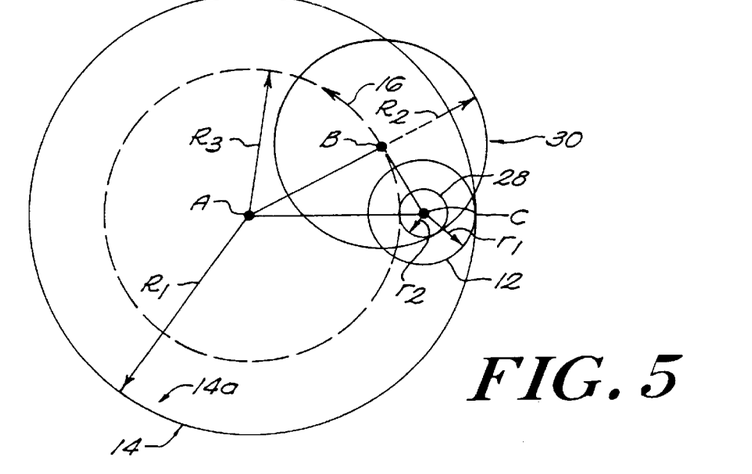
FIG. 5 is a schematic top view showing the relationships among the tube, whip rod, whip rod stem, and the drive hole, all shown in FIGS. 2–4.

FIG. 5 shows the relationships between the tube, the whip rod, the whip rod stem and the drive hole on the drive plate, where A, B, and C are the centers of the tube, the drive hole, and the rod, respectively, and $R_1$ and $R_2$ are the radii of the tube and the drive hole, respectively, $r_1$ and $r_2$ the radii of the rod and the rod stem, respectively.

The orbital motion is shown by the dotted line circle with radius $R_3$. This radius is determined primarily by the crank radius of the orbital drive plate plus some elastic deformation in the drive plate. Triangle ABC resolves around the tube center A at a speed ω (rpm) where the length of each side of the triangle is defined by the aforementioned radii such as:

$AB=R_3$ $AC=R_1-r_1$ $BC=R_2-r_2$

Thus, one may treat triangle ABC as a rigid frame upon which various rotating elements are pivoted. One convenient way to study the speed of each rotating element is to subtract the speed ω from the speed of every element to facilitate the study and then to add the ω back.

In doing so, the frame ABC will be standing still and the tube and the drive hole would revolve clockwise with a speed of -ω.

The rod, induced by its rolling contact with the tube, revolves at a speed of $-\omega \times R_1/r_1$. Likewise, if its speed is induced by the rolling contact between the rod stem and the drive holes with no sliding motion, then the rod stem revolves at a speed of $-\omega \times R_2/r_2$. Thus, if $R_1/r_1=R_2/r_2$, then there is no sliding motion either between the rod and the tube or between the rod stem and the drive hole.

Since the contact force between the rod and the tube are much larger than the contact force between the rod stem and the drive holes, the sliding motion due to an improper match of the diameters would result in sliding motion at the rod stem.

Generally speaking, the edge-hanging bearing of a whip rod is constantly washed by the incoming feed fluid. The feed may involve both fresh and re-circulating feeds. In either case, it is desirable to pre-filter the hard abrasive solids from the incoming feed entering the water box of the evaporator to prolong the bearing life. The material selected for the bearing should be compatible with the feed fluid regarding known factors such as corrosion resistance and lubricity.

Cost of the filtration, the material of the bearing, and service down time, are all factors in the final choice of a bearing design which will be trade-off against certain key physical properties of a bearing design which are discussed below.

Using the tires of an automobile as an example, each tire carries the load upon the road surface by the pressure inside the tire multiplied by the instantaneous contact area or the "footprint" between the tire and the road. For a pneumatic tire, the load is approximately equal to the area of the footprint multiplied by the tire pressure.

To achieve minimum wear, the load should be carried normal to the footprint and the wheel rolls in a direction normal to its axial. For instance, it is a well-known fact that a tire would wear faster during steering because the "footprint" would have to rotate during steering to cause a sliding motion between the tire and the road, and consequently the wear. A tractor has a very large footprint and is therefore very difficult to steer. On the other hand, a hardened steel wheel with a crowned rim is very easy to turn with minimum wear.

For the edge-hanging whip rod there are three general approaches to this rolling-to-fixed bearing interface, namely, (a) one wearing surface is designed to remain substantially unchanged, (b) both surfaces are designed to remain substantially unchanged, and (c) both surfaces are allowed wear down.

Figure 6:
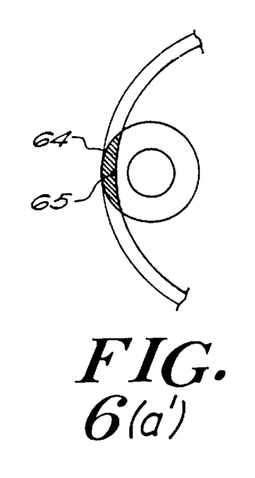
Figure 6A:
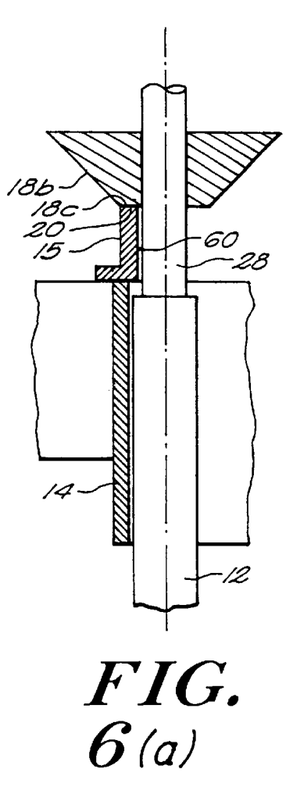
FIGS. 6a'–6c' show simplified views in side elevation, and partially in section, of alternative bearing contours for an edge hanging whip rod.
Figure 6B:
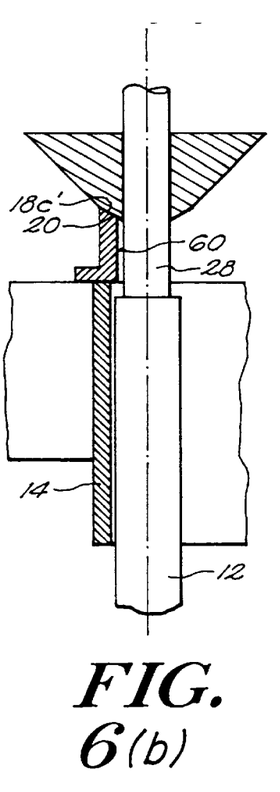
Figure 6C:
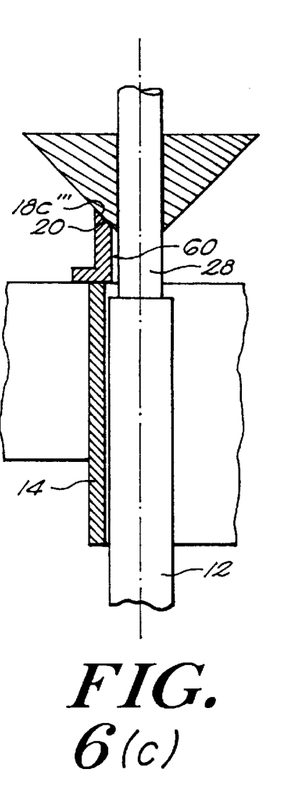

FIG. 6 shows three bearing contours and their footprints to illustrate the possible consequences that may effect the useful life of each one when only the fixed bearing 15 is subjected to significant over time wear, while the conical bearing 18 is relatively much harder and is substantially wear resistant. In this system, a gap 60 is maintained between the rim bearing 15 and the rod stem 28 so that there is no wear of the rim bearing 15 on its ID surface.

In FIG. 6a, bearing contact surfaces 18c (of the cone bearing 18) and 20 (of the rim bearing 15) are both flat and normal to the axis of the rod 12. The resulting "footprint" 64, shown in FIG. 6a', is in the shape of a crescent with its center of rotation at point 65. The area of this footprint is quite substantial so that the pressure can be quite low. But the velocity distribution is rather uneven with a maximum velocity at the tip of the crescent.

In principle, when the contact surfaces are in conical shapes, their contact area should be narrowed into a single line if both surfaces are formed on rigid bodies. However, if one has some elasticity, then the contact line (64', 64") is narrowed as a function of the conical angle, such as shown in FIGS. 6b' and FIG. 6c', where the corresponding cone angles in FIG. 6b and FIG. 6c are made to be progressively sharper.

Figure 7:
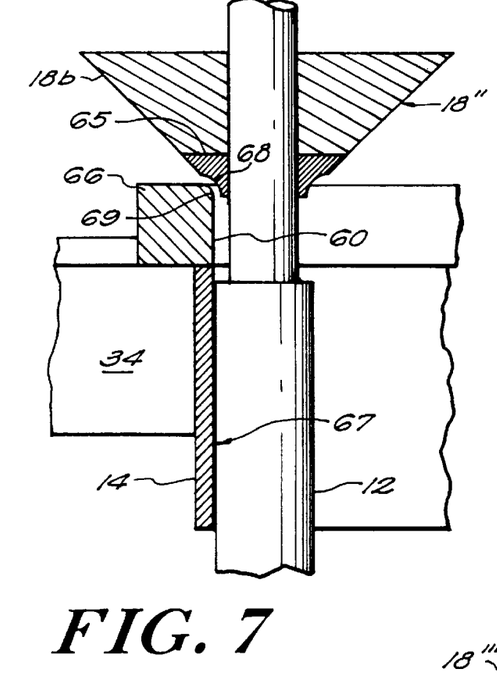
FIGS. 7 and 8 are views in side elevation, and partially in section, of alternative edge-hanging bearings according to the present invention.

FIG. 7 shows an alternative embodiment of the present invention that uses a hardened cone bearing tip 65 of bearing 18" matched with a hardened, ring-like rim bearing 66. A highly polished cone track 68 at the tip of the cone is matched by a rounded inside corner 69 of the rim bearing ring 66. Some precision machining is needed in this arrangement to match the contact point of these two rings with the effective contact line 67 of the whip rod 12 and the tube 14.

Figure 8:
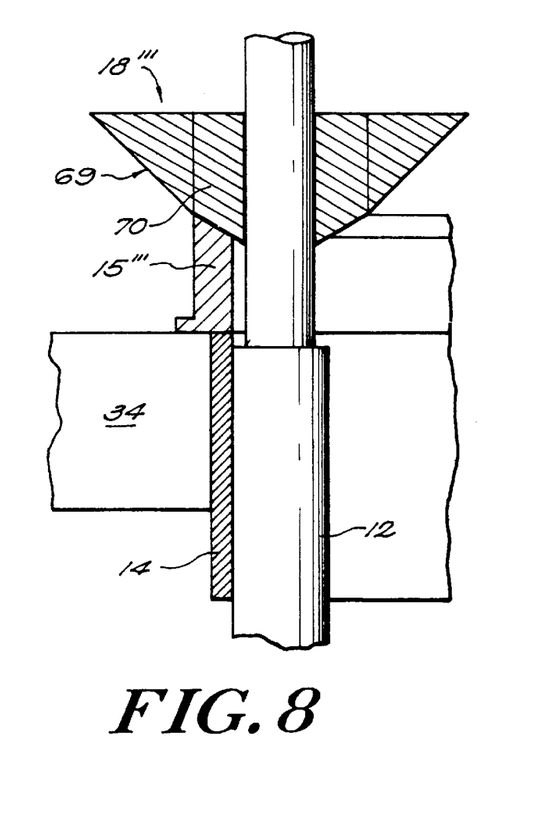

FIG. 8 shows still another alternative embodiment of the present invention where both a cone thrust bearing 18''' and a rim bearing 15''' are wearable. Under this condition, they wear into some mutual fit. Even in this condition, it is desirable to choose the material for the upper cone 18''' to be much more durable than that of the lower rim bearing 15'''. Furthermore, the cone bearing 18''' as shown is made in two parts, a central part 70 that contacts and rolls over the rim bearing 15''' during operation, as shown, and an outer part 69 made with a material that wears even faster than the material forming the rim bearing 15'''. Since the cone 69 is used only during start-up, by making it out of a comparatively easy-to-wear material, it will wear so as to blend in with the surface of 70 to form a continuous surface. This allows a smooth transition when raising the cone as the system starts-up from a non-orbiting or standstill condition.

Figure 9:
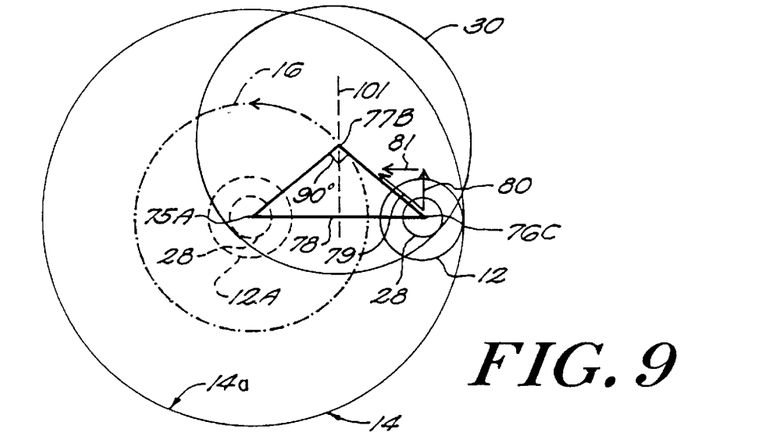
FIG. 9 is a view corresponding to FIG. 5 showing a geometry for freezing applications where the rod may orbit in a shrinking radius.

FIG. 9 shows the design of the orbital drive for freezing application where the rods may have to orbit in an ever shrinking diameter when ice begins to freeze on the surface of the tube until the rod is frozen solid by the ice at the center of the tube.

To allow the rod to orbit in any concentric circles inside tube 14a, one geometric condition is to place the center 77 or B of the drive hole 30, anywhere on dashed line 101. The line 101 is normal to a radius 78 of the tube 14, and is located midway between whip rod 12 (touching the inside surface 14A of the tube 14 with its center at 76 or C) and whip rod 12A (shown in phantom at the center 75 or A of tube 14). Rod 12A is the position of the whip rod when it is frozen in place in the tube.

The preferred location on line 101 for the center of the drive hole is point 77 or B. At this location, the angle ∠ABC between the two whip rod position is 90°. The corresponding drive hole 30, and rod stem 28 is neither too small to push the whip rod effectively, nor too big to be used to regulate the flow rate.

The rod stem 28 is pushed by the drive hole 30 with a radial force vector 79, which is the sum of vectors 80 and 81. Force vector 80 is the effective pushing force or friction force tangential to the tube surface 14a. Force vector 81 is acting against the centrifugal force of the rod. These two vectors are equal in magnitude and normal to each other. Thus, with this arrangement, the portion of the centrifugal force of the orbiting rod acting upon the rod stem 28 will be reduced by an amount equal to its friction force.

With any of the foregoing embodiments, dynamic balancing of the centrifugal force of the rods may be accomplished by dividing the rods into two groups, such as two concentric groups, or two diagonal pairs, so that the center of gravity (C.G.) of the two groups will orbit around the central axis of the evaporator, but with a 180° phase difference.

FIG. 10 shows a preferred water distribution arrangement of this invention. The view of FIG. 10 looks top down onto the orbital drive system which, as shown, has four layers of components. At the top, there are the stop discs 32 (closely hatched), which cover a large portion of the drive holes 30 on the drive plate 26 (less closely hatched). The size of disc 32 is designed to leave a crescent slot 105. The slot 105 remains generally the same size over the entire orbiting cycle and is used to regulate the flow rate of the fluid into an associated cell of the honeycomb grill 36, which is located beneath the drive plate 26. The honeycomb grill is attached on top of the tube sheet and confines the flow of the first process fluid into each tube 14' (with each cell being centered over an associated ruhe 14). While hexagonal walls are preferred, other shapes may be used. If flow control is less important, the support function of the grill 36 can be provided by alternative structures, e.g., stand-off posts secured to the tube sheet 34.

An alternative arrangement is to use holes 34 in the top discs, as discussed above.

It is interesting to note that the crescent shaped slot has a self-cleaning capability to prevent clogging. It also directs the flow just in front of the orbiting rod and the edge-hanging conical bearing.

There has been described a support and direct mechanical drive for a hanging whip rod which dramatically reduces the load, friction and wear on the whip rod and its drive. The life of the rod and its drive are increased and the power required to drive the whip rod is decreased. These advantages are achieved with comparatively simple, low cost constructions that are compatible with known hanging, directly-driven whip rod and tube heat exchangers. This invention can also regulate the liquid infeed to the tube(s) of the exchanger.

While this invention has been described with reference to its preferred embodiments, it will be understood that various modifications and alterations will occur to those skilled in the art from the foregoing detailed description and the accompanying drawings.

For example, while the circular rim bearing had been described as (i) the upper edge of the heat transfer tube, or (ii) a cylindrical bearing member secured to, or above, the tube, or (iii) a collar secured on the drive plate, it could also be formed on other members, or in different locations on these members, as long as the rod is edge-hung as it revolves in operation and the rod and its edge or lip member can roll freely. The rim bearing could be formed on a separate member mounted within the tube, on the tube sheet, or on a member other than the tube, tube sheet or the drive plate. Also, while the rod has been described as supported when at rest by a stop member acting on the drive plate, a variety of equivalent mechanical expedients to limit the fall of and suspend the rod will occur to those skilled in the art. Further, while a stem pin and disc-type stop are disclosed, the invention is not limited to precisely these implementation. For example, the stop disc can be any plate-like, or even non-plate member, e.g., a set of radially extending arms, so long as it can engage and arrest the fall of the rod when the orbiting ceases. Still further, while the conical thrust bearing 18 has been described with certain preferred inclinations for various locations in the structure, these inclinations can vary as long as they are sufficient to produce (i) the edge-hanging support, (ii) a rolling engagement with the rim bearing, and (iii) the climbing action to raise the thrust bearing and rod from the fallen, standstill position to the raised, orbiting position—for a given orbiting speed. More specifically, if the whip rod is orbited at speeds where the centrifugal force effect on the rod 12 is less than 1 g, the angle of inclination of the conical surface 18b must be shallower than the 45°, e.g., 30°. Still further, while this invention has been described mainly with reference to one tube with one rod disposed in that tube, it will be understood that typically there will be many tubes, each with one or more rods disposed therein, with the rods driven by one or more drive plates, or equivalent structures.

These and other modification and variations which will occur to those skilled in the art are intended to all within the scope of the appended claims.

What is claimed is:

1. In a heat exchanger having at least one heat transfer tube that exchanges heat radially through the tube wall between hot and cold fluids, one of which is a process fluid that flows through the tube at least along the inner surface of the tube, and an orbitable whip rod disposed in the tube, an improved whip rod support and drive comprising:

an orbital drive that propels the whip rod over the inside surface of the heat transfer tube;

a circular bearing surface generally coaxial with the heat transfer tube and extending transversely to the central axis of the tube; and a thrust bearing secured at the upper end of the whip rod that engages and rolls with an overhanging edge on said circular bearing surface during said orbiting, said engagement supporting the weight of the rod during said orbiting.

2. The improved whip rod support and drive of claim 1 wherein said thrust bearing has a generally conical surface that engages said circular bearing.

3. The improved whip rod support and drive of claim 1 wherein said bearing surface is a beveled upper edge of generally a cylindrical bearing secured over the upper end of the heat transfer tube.

4. The improved whip rod support and drive of claim 3 wherein said beveled bearing surface has substantially the same angle of inclination as said generally conical surface, and the value of said angle of inclination during said orbiting at a rate sufficient to produce a centrifugal force on the whip rod of at least about 1 g places the rod in a rolling contact with the heat transfer tube and places the conical bearing in a rolling contact with the circular bearing surface.

5. The improved whip rod support and drive of claim 4 wherein said orbital drive includes an orbiting drive plate oriented generally transversely to the tube and having a drive hole in the drive plate coupled to the whip rod.

6. The improved whip rod support and drive of claims 1 or 5 further comprising a stop member that holds the rod within the tube in the absence of said orbiting.

7. The improved whip rod support and drive of claim 6 wherein said stop member comprises a stem secured to and extending axially from the upper end of the whip rod and a transversely oriented disc carried on said stem.

8. The improved whip rod support and drive of claim 7 wherein said stem is captured in the drive plate hole and wherein said disc is sized and configured to engage said drive plate in the absence of said orbiting.

9. The improved whip rod support and drive of claim 7 where the length of said stem is such that said conical bearing is positioned vertically with respect to said circular bearing surface before operation of said orbital drive to enable said engagement during said orbiting.

10. The improved whip rod support and drive of claim 7 wherein said stem length, bearing surfaces, stop member and drive hole are sized and configured such that the opening between said disc and said drive plate during said orbiting creates an inflet flow control valve for the process fluid to the tube.

11. The improved whip rod support and drive of claim 9 further comprising a tube sheet that supports the tube near its upper end and at least one drive plate support members secured on said tube sheet to engage and support said drive plate in the absence of said orbiting.

12. The improved whip rod support and drive of claim 7 further comprising a collar secured to said drive plate and surrounding said drive plate hole, and wherein said circular bearing surface is the upper edge of said collar and said thrust bearing is the lower face of said disc, and wherein said disc is fixed on said stem.

13. The improved whip rod support and drive of claim 11 wherein said upper edge is beveled, said thrust bearing is conical, and the angles of inclination of said bevel and said conical bearing are substantially equal.

14. A method of supporting a whip rod within an open-ended, vertically-oriented heat transfer tube, comprising the steps of driving said whip rod to orbit within said tube during operation, edge hanging the whip rod in a nonrotating surface when it is orbiting to thereby support its weight, suspending the non-orbiting whip rod at its upper end when its is not orbiting, and limiting the fall of the whip rod when it is not orbiting to a pre-selected distance.

15. The whip rod support method of claim 14 wherein said orbiting and edge-hanging occur simultaneously with substantially only rolling contacts.

16. The whip rod support method of claim 15 further comprising the step of camming the whip rod from its fallen, non-orbiting position to a raised, edge-hanging position when orbiting, said camming being driven by the centrifugal force on the whip rod produced by said orbiting.

* * * * *